(12) United States Patent
Nagai et al.

(10) Patent No.: US 6,296,269 B1
(45) Date of Patent: Oct. 2, 2001

(54) AIR BAG COVER

(75) Inventors: Yutaka Nagai, Ichinomiya; Chiharu Totani, Gifu; Fumitake Kobayashi, Inazawa; Tadao Tanaka, Nagoya; Hiroyuki Tajima, Chiryu; Hiroshi Ishiyama, Toyota, all of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/310,117

(22) Filed: May 12, 1999

(30) Foreign Application Priority Data

May 12, 1998 (JP) .................................................. 10-129300

(51) Int. Cl.[7] .................................................. B60R 21/16
(52) U.S. Cl. ..................................... 280/728.2; 280/730.2
(58) Field of Search .............................. 280/728.1, 728.2, 280/730.1, 730.2

(56) References Cited

U.S. PATENT DOCUMENTS 5,791,683 * 8/1998 Shibata et al. ..................... 280/730.2

FOREIGN PATENT DOCUMENTS 9-129617    5/1997  (JP) .
9-315253   12/1997  (JP) .

* cited by examiner

Primary Examiner—Paul N. Dickson
Assistant Examiner—Faye M. Fleming
(74) Attorney, Agent, or Firm—Pillsbury Winthrop LLP Intellectual Property Group

(57) ABSTRACT

An air bag cover is formed of synthetic resin and is connected to and held by the body of a car in a plurality of discontinuous portions thereof along the peripheral edge of an opening formed on the interior side of the car in such a manner that the air bag cover not only can cover an air bag folded in the peripheral edge of the opening on the car interior side, but also, when an air bag main body of the air bag is developed and expanded, can be so opened and moved as to allow the air bag main body to project toward the opening side. The air bag cover further includes a restricting wall which projects toward the body of the car in such a manner that it can connect together these connecting/ holding portions while the restricting wall is disposed on the back surface side of the air bag cover, in more particular, on the side of the folded air bag main body that is distant from the opening and on the opening side of connecting/holding portions.

6 Claims, 14 Drawing Sheets

AIR BAG COVER

BACKGROUND OF THE INVENTION

1. Field of the Invention

The present invention relates to an air bag cover which is formed of synthetic resin and is used to cover an air bag of a side air bag device to be stored into the peripheral edge of an opening formed in the periphery of a door of a car or the like.

The present application is based on Japanese Patent Application No. Hei. 10-129300, which is incorporated herein by reference.

2. Description of the Related Art

Conventionally, in a side air bag device of this type, an air bag is folded and stored in the peripheral edge of an opening formed in the peripheral edge of a door or a window on the interior side of a car, in particular, over a portion thereof extending from a pillar portion and roof side rail portion; and, when gas for expansion is charged into the air bag, an air bag cover covering the folded air bag is opened and moved to thereby develop and expand the air bag (see Japanese Patent Publication No. Hei. 9-315253).

And, in order that, when the air bag is developed and expanded, the air bag cover can be opened and moved by a given amount while preventing the damage thereof, on the back surface side of the air bag cover, in particular, in the two discontinuous portions thereof along the peripheral edge of the above-mentioned opening, there are provided a plurality of connecting/holding portions where the air bag cover can be connected to and held by the body of the car (see Japanese Patent Application No. Hei. 9-129617).

However, in the early stage of the expansion of the air bag main body, during the time until the air bag main body projects toward the opening side, the pressure of the air bag main body acts on a wide area on the back surface side of the air bag cover and, for this reason, the connecting/holding portions themselves must be so formed as to have a strength of a certain degree.

Therefore, in order to enhance the strength thereof, the connecting/holding portions are structured in such a manner that they are large in thickness. However, since the air bag cover itself is molded of synthetic resin, a sink or a depression is easy to occur in the air bag cover due to the large thickness of the connecting/holding portions.

SUMMARY OF THE INVENTION

The present invention aims at eliminating the above drawback found in the conventional air bag covers. Accordingly, it is an object of the invention to provide an air bag cover which can prevent occurrence of such sink to thereby be able to secure a sufficient strength when expanding an air bag.

In attaining the above-object, according to the invention, there is provided an air bag cover which is formed of synthetic resin and also which is connected to and held by the body of a car in a plurality of discontinuous connecting/holding portions thereof along the peripheral edge of an opening formed on the interior side of the car in such a manner that it covers an air bag folded in the peripheral edge of the above-mentioned opening and, when an air bag main body of the folded air bag is developed and expanded, it can be so opened and moved as to allow the air bag main body to project toward the above-mentioned opening. A restricting wall projects toward the car body in such a manner that it can connect together the plurality of connecting/holding portions on the back surface side of the present air bag cover, in more particular, on the side of the air bag main body that is distant from the above-mentioned opening and on the above-mentioned opening side of the connecting/holding portions.

According to the invention, the present air bag cover includes the projecting wall which projects toward the car body in such a manner that it can connect together the plurality of connecting/holding portions on the back surface side of the present air bag cover, in more particular, on the side of the air bag main body that is distant from the above-mentioned opening and on the above-mentioned opening side of the connecting/holding portions. Thanks to this, until the air bag main body projects toward the opening side in the early stage of the expansion of the air bag main body, even if the pressure of the air bag main body is going to act on the respective connecting/holding portions, such pressure is allowed to act only a small area due to the restricting wall disposed on the opening side of the connecting/holding portions, thereby being able to reduce the pressure loads that could be applied onto the respective connecting/holding portions.

This in turn makes it possible to reduce the thicknesses of the respective connecting/holding portions, thereby being able to prevent the sink that could be otherwise produced in molding.

Therefore, according to the invention, there can be provided an air bag cover which can prevent the occurrence of the sink to thereby be able to secure a sufficient strength when the air bag is expanded.

Also, since, when the air bag main body is developed and expanded, the expansion of the air bag main body parting away from the opening side is restricted by the restricting wall, the projecting direction of the air bag main body can be directed in a given direction, which makes it possible to increase the fly-out speed of the air bag main body toward the opening side.

Features and advantages of the invention will be evident from the following detailed description of the preferred embodiments described in conjunction with the attached drawings.

DETAILED DESCRIPTION OF THE PREFERRED EMBODIMENTS

Figure 1:
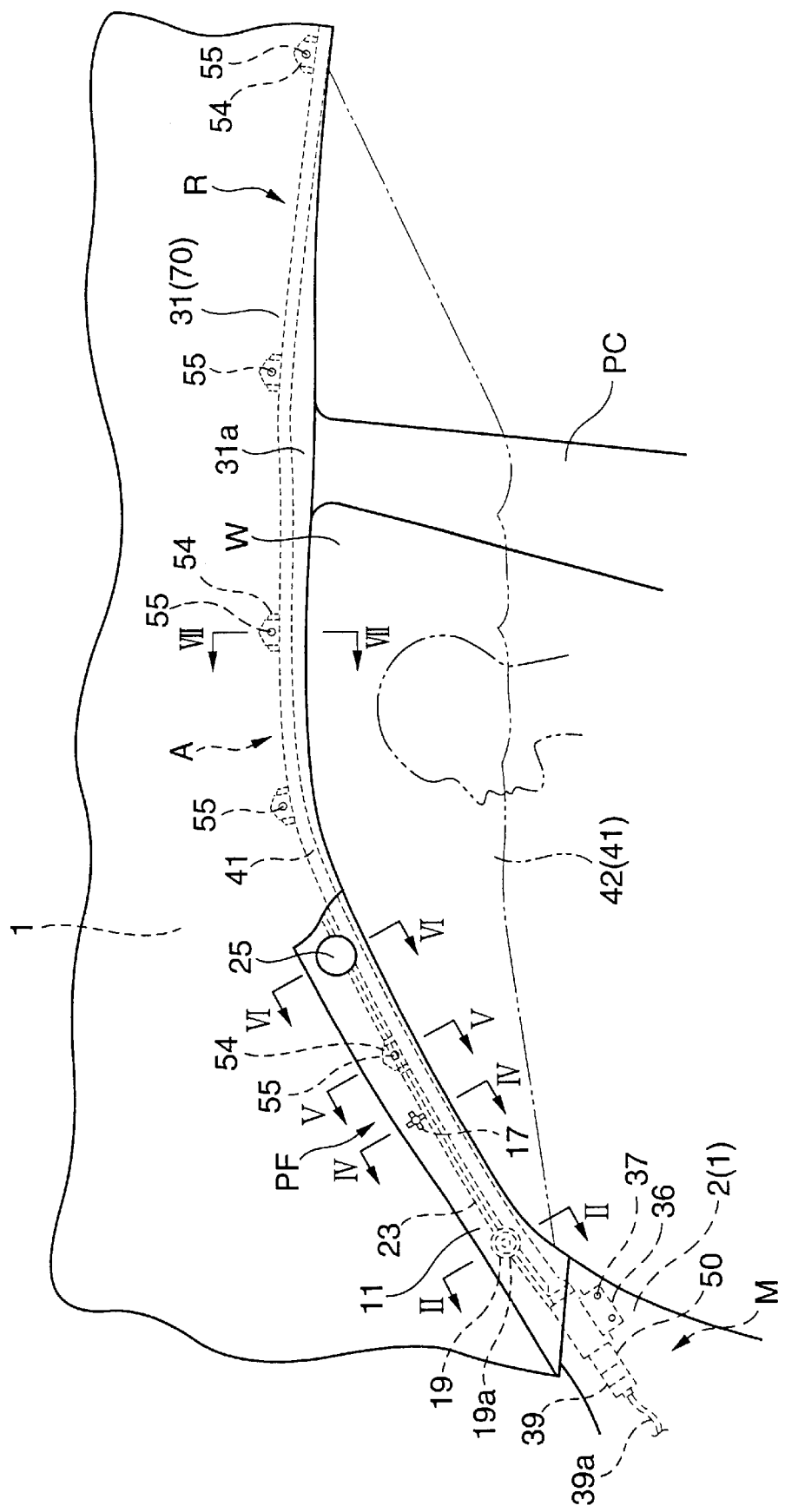
FIG. 1 is a front view of a side air bag device to which an embodiment of a garnish serving as an air bag cover according to the invention is applied, showing how the side air bag device is used.

Now, description will be given below of an embodiment of an air bag cover, according to the invention with reference to the accompanying drawings. That is, an air bag cover 11 according to the embodiment of the invention shown in FIGS. 1, 2 and 4 to 6 is an air bag which can be used in a side air bag device M incorporating therein an air bag 41 that is folded between a front pillar portion PF and a roof side rail portion R disposed in the peripheral edge of an opening W formed in a door portion or a window portion on the interior side of a car.

The side air bag device M comprises an air bag 41, an inflator 39 which is used to supply gas for expansion to the folded air bag 41, a mounting bracket 36 which is used not only to connect the air bag 41 to the inflator 39 but also to mount and fix the inflator 39 to a side panel 2 of a body 1 of the car, and two kinds of air bag covers of a first cover 11 and a second cover 31 for covering the folded air bag 41. An air bag cover, according to the present embodiment, is composed of a garnish 11 as the first air bag cover disposed in the front pillar portion PF and a roof interior member 31 as the second air bag cover disposed in the roof side rail portion R. And, according to the present embodiment, the air bag cover, which is to be connected to and held by the body 1 through three connecting/holding portions thereof 13, 17 and 19 thereof, is formed as the garnish 11.

Figure 10:
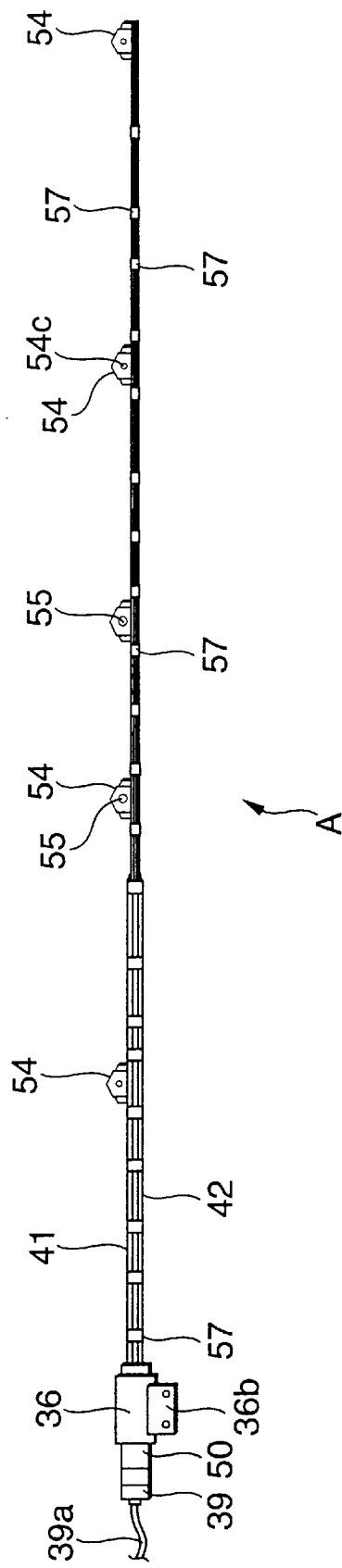
FIG. 10 is a front view of an air bag assembly used in the present embodiment.

Also, according to the present embodiment, until the side air bag device M, with the air bag 41 extending from the front pillar portion PF to the side rail portion R, is mounted onto the body 1 of the car, as shown in FIG. 10, the side air bag device M is treated as an air bag assembly A.

Referring to the structure of the front pillar portion PF, as shown in FIGS. 2 to 6, the front pillar portion PF comprises an folded air bag 41; a front pillar main body 4, which is situated on the body 1 side and is composed of a reinforcing panel 6, an inner panel 7 and an outer panel 6 respectively made of steel plates; and, a garnish 11 serving as an air bag cover 11 which is to be mounted on and fixed to the inner panel 7 for covering the folded air bag 41.

At given positions of the inner panel 7, there are formed a mounting hole 7a (see FIG. 6) for mounting and fixing the garnish 11, a securing hole 7c (see FIG. 4), a securing hole 7d (see FIGS. 2 and 3), and a mounting hole 7g (see FIG. 5) for mounting the folded air bag 41. A nut 7b is fixed to the mounting hole 7a, and a mounting bolt 29 serving as fixing means for mounting and fixing the garnish 11 is inserted into the mounting hole 7a: and, the securing leg portion 17 of the garnish 11 is inserted into and secured to the securing hole 7c.

Also, a securing pin 21, which is disposed in the garnish 11 and is formed of metal, is inserted into and secured to the securing hole 7d. The securing hole 7d includes a large-width portion 7e opened in a circular shape and a small-width portion 7f having a smaller opening width than the large-width portion 7e and extending from the large-width portion 7e. The extending direction of the small-width portion 7f is a direction in which a sliding/securing portion 19 of a cover main body 12 (which will be discussed later) with the securing pin 21 embedded therein is moved when the air bag 41 is developed and expanded; and, in the present embodiment, the small-width portion 7f is formed in such a manner as to extend obliquely upwardly along the front pillar portion PF.

Also, the mounting hole 7g is formed in the inner panel 7 in such a manner that a nut 7h is fixed to the peripheral edge of the back surface side (car outside) of the inner panel 7. Further, a weather strip S is mounted on the end portion of the pillar main body 4. By the way, reference character D shown in FIGS. 2, 4 to 7 designates a door of a car.

The garnish 11 serving as an air bag cover is composed of a garnish main body 12 serving as a cover main body formed of synthetic resin such as olefin-system thermoplastic elastomer or the like, and a cap 25 to be disposed in the garnish main body 12.

The garnish main body 12 serving as a cover main body, as shown in FIGS. 2, and 4 to 6, comprises a long molding portion 12a which is formed by injection molding, and a surface layer 12e which is formed of fabric or the like and is to be bonded onto the design surface side of the garnish main body 12; and, the molding portion 12a includes, in the edge thereof on the opening W side, a door portion 12d with a thin hinge portion 12c interposed between a general portion 12b thereof and the door portion 12d, whereby, when developing and expanding the air bag 41, the door portion 12d can be rotated about the hinge portion 12c to be opened with respect to the general portion 12b. By the way, in the general portion 12b, not only there are disposed a mounting boss portion 13, the securing leg portion 17, and the sliding/securing portion 19 with the securing pin 21 embedded therein, but also there is provided a restricting wall 23. Also, the molding portion 12a is formed by insert molding, in which the securing pin 21 is used as an insert.

Figure 6:
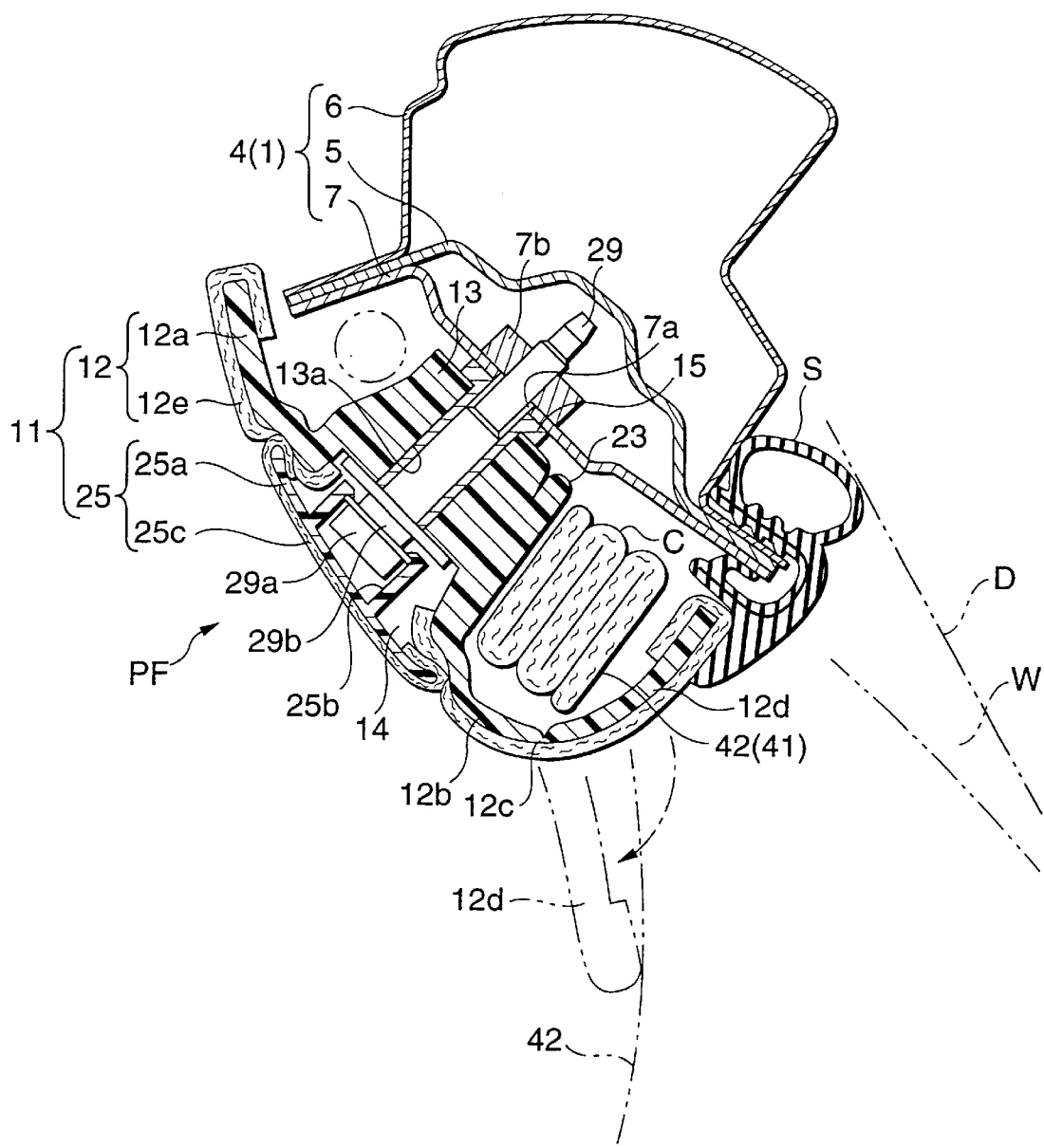
FIG. 6 is an enlarged schematic section view taken along the arrow line VI—VI shown in FIG. 1.
Figure 8:
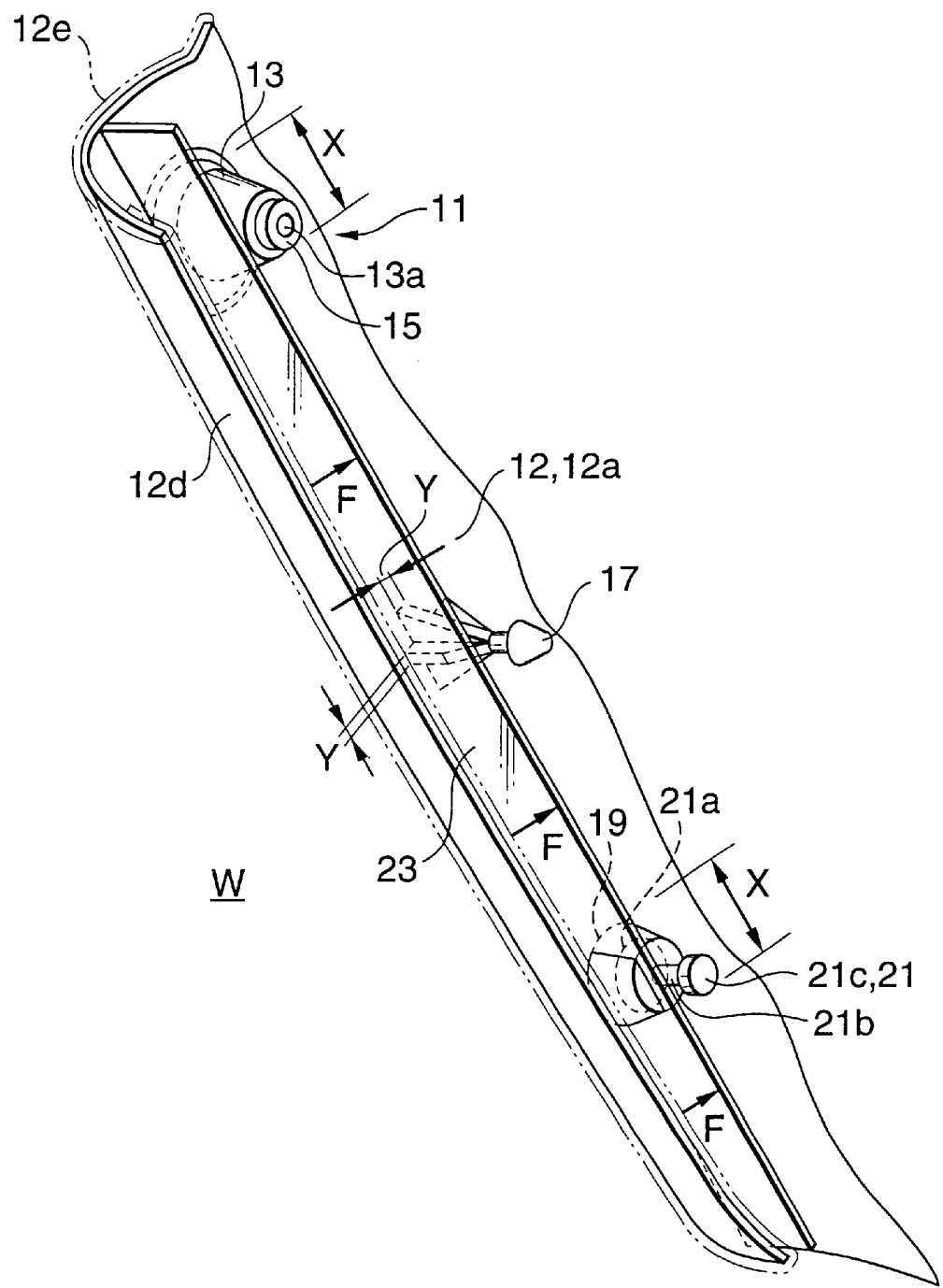
FIG. 8 is a perspective view of the present embodiment, when it is viewed from the back surface side of the garnish.

And, in the upper portion of the garnish main body 12, as shown in FIGS. 1, 6 and 8, there is formed the mounting boss portion 13 including a mounting hole 13a through which the mounting bolt 29 can be inserted. A sleeve 15, which is formed of metal, is fitted with the inner peripheral surface of the mounting hole 13a so that the fastening force of the mounting bolt 29 can be secured when the garnish main body 12 is mounted and fixed to the inner panel 7. Also, in the periphery of the mounting boss portion 13 that is situated on the front surface side (car interior side) of the garnish main body 12, there is formed a storing recessed portion 14 into which the cap 25 can be fitted.

The cap 25, which is used to cover the mounting bolt 29, includes a molding portion 25a which can be formed of synthetic resin such as polyamide or the like by injection molding, and a surface layer 25c which is formed of the same material as the surface layer 12e and is to be bonded to the molding portion 25a. In the molding portion 25a, there is provided a securing pawl 25b which can be secured to a securing groove 29b formed in the head portion 29a of the mounting bolt 29. By the way, in the cap 25, there is disposed a removal preventive member which can be inserted via a through hole (not shown) formed in the storing recessed portion 14 and is capable of securing the cap 25 to the peripheral edge of the present through hole: that is, even if the cap 25 is removed from the mounting bolt 29, the present removal preventive member is able to prevent the cap 25 from being removed from the garnish main body 12.

Figure 4:
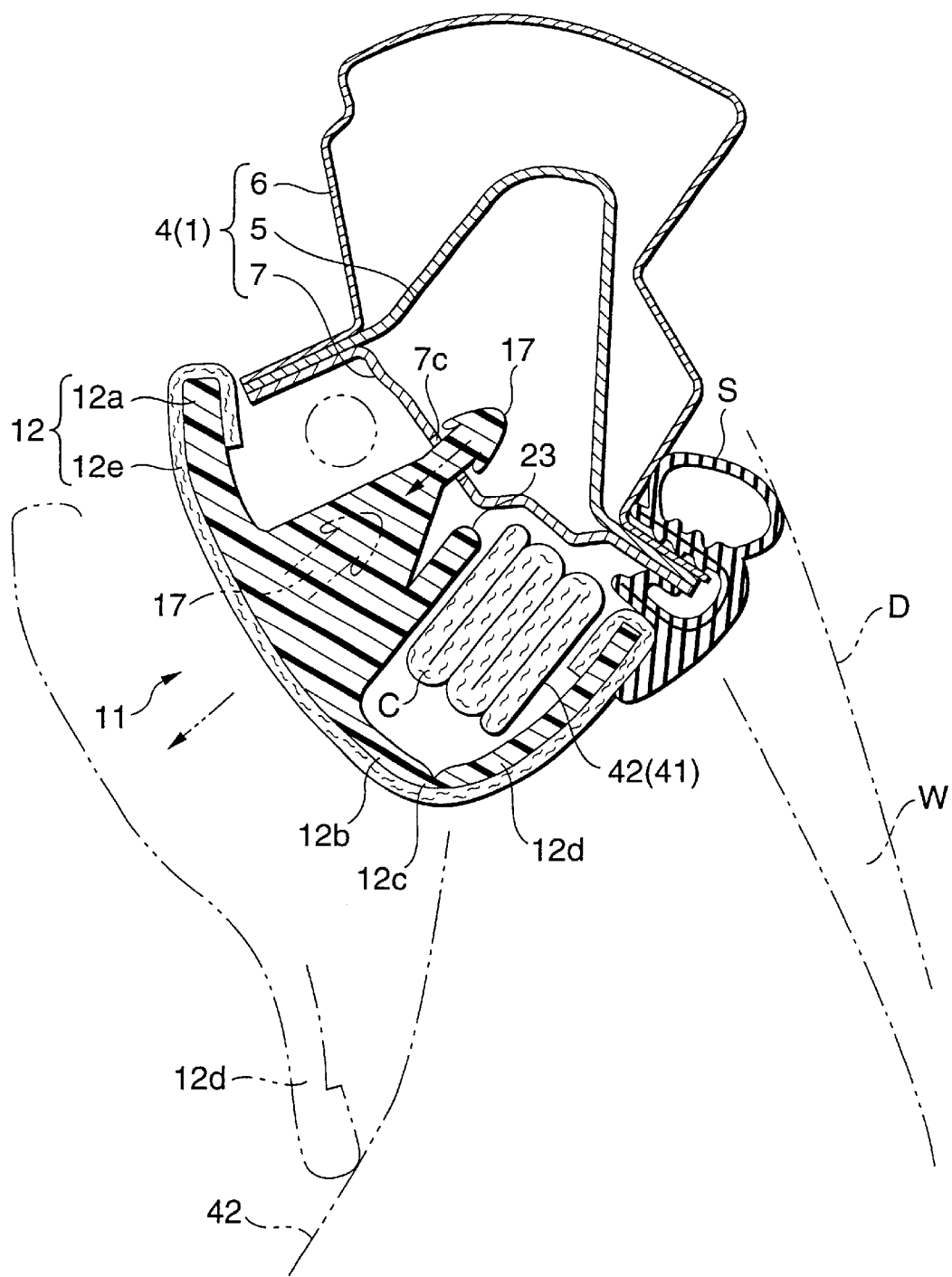
FIG. 4 is an enlarged schematic section view taken along the arrow line IV—IV shown in FIG. 1.

On the back surface side of the garnish main body 12, in more particular, in a substantially middle portion thereof in the vertical direction, as shown in FIG. 4, there is formed the securing leg portion 17 which can be inserted into and secured to the securing hole 7c of the inner panel 7.

Figure 2:
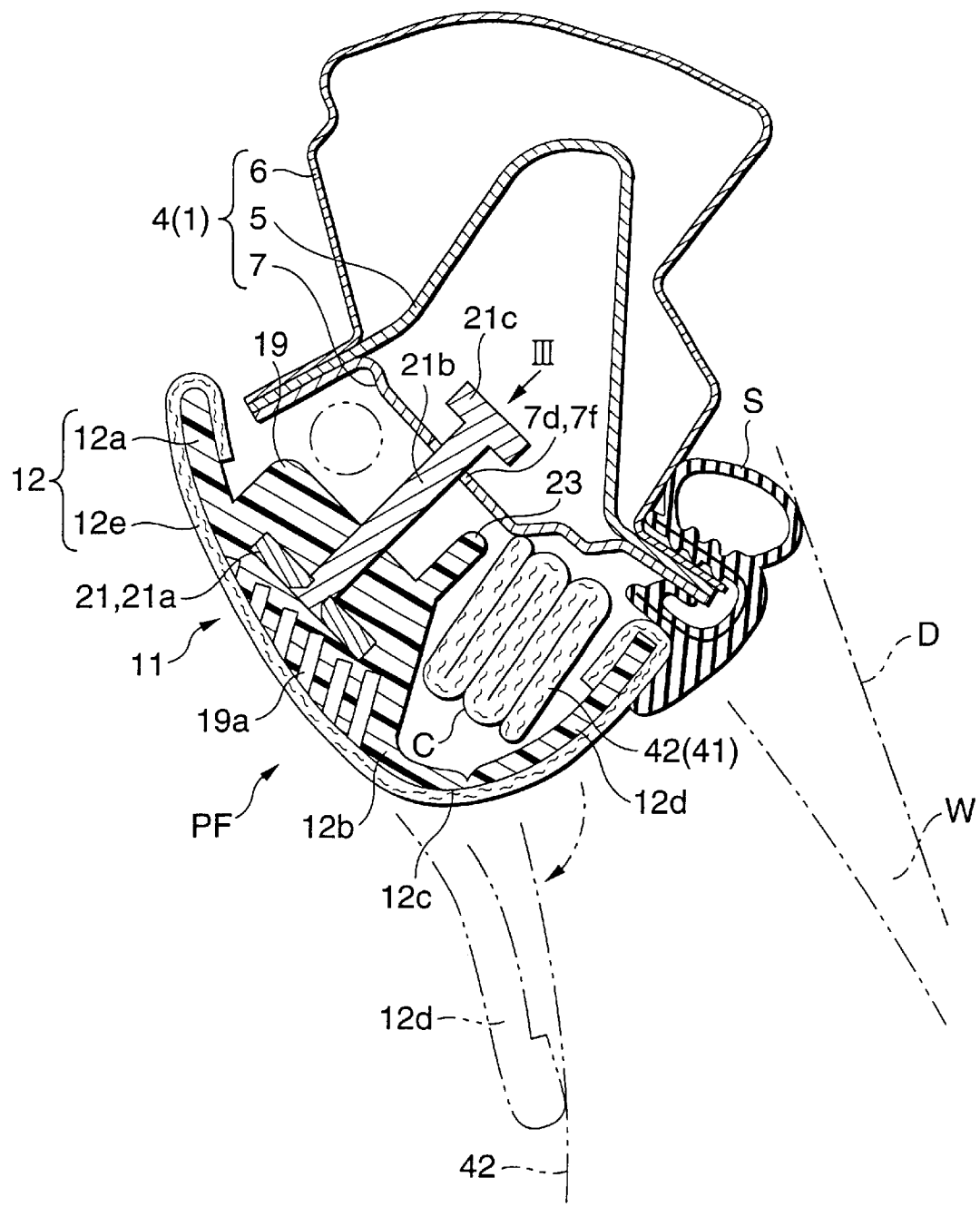
FIG. 2 is an enlarged schematic section view taken along the arrow line II—II shown in FIG. 1.
Figure 3:
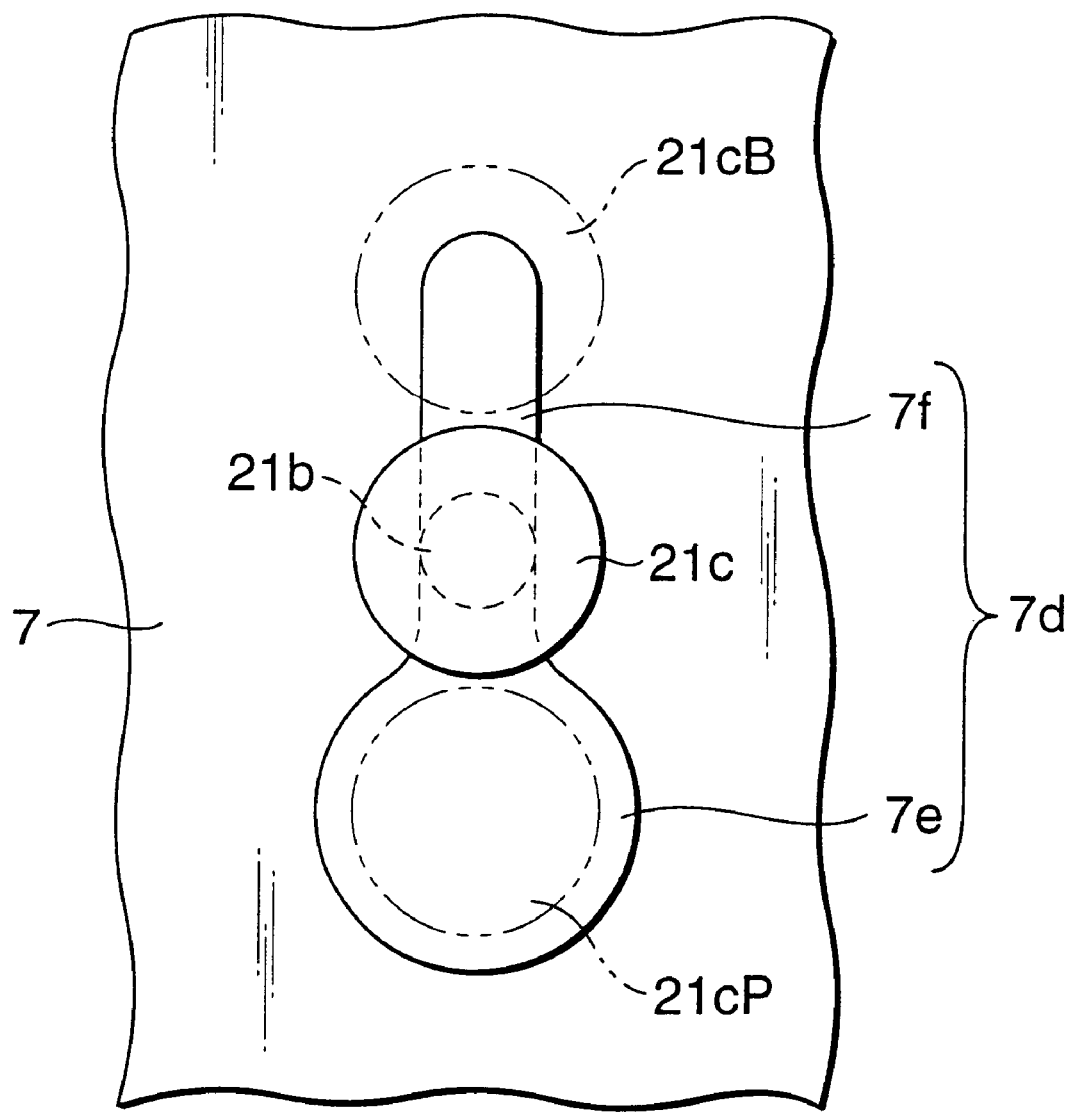
FIG. 3 is a view of the peripheral edge of a securing hole when it is viewed from the direction of an arrow line III shown in FIG. 2.
Figure 9:
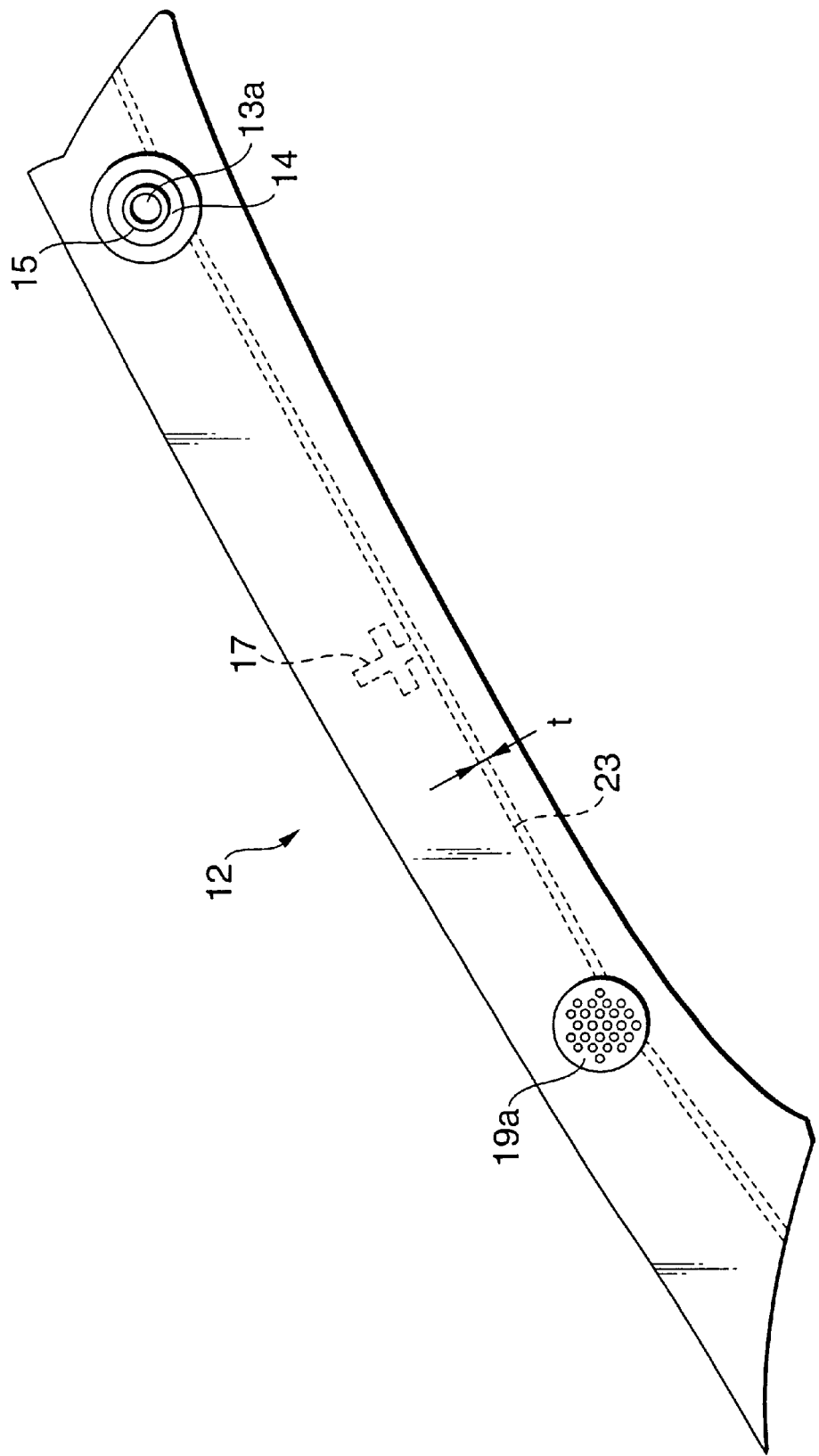
FIG. 9 is a partially enlarged front view of a garnish main body of the garnish employed in the present embodiment, while a surface layer thereof is omitted.

Also, in the lower portion of the back surface side (car exterior side) of the garnish main body 12, as shown in FIGS. 2 and 3, there is formed the sliding/securing portion 19 in which the securing pin 21 is embedded. On the front surface side (car interior side) of the sliding/securing portion 19, as shown in FIGS. 2 and 9, there are formed a large number of lightening holes 19a in order to be able to restrict the influence of the sink or depression as much as possible.

The securing pin 21, which is formed of metal such as brass or the like, includes a embedding flange portion 21a and a securing flange portion 21c which are respectively formed in the two end portions of a cylindrical-shaped shaft portion 21b of the securing pin 21 in such a manner as to project in the radial direction of the securing pin 21. And, the embedding flange portion 21a is embedded in the sliding/securing portion 19. On the other hand, the securing flange portion 21c is secured to the peripheral edge of the small-width portion 7f of the securing hole 7d formed in the inner panel 7, with the shaft portion 21b inserted through the small-width portion 7f. The securing flange portion 21c is formed larger than the opening width of the small-width portion 7f, and the securing flange portion 21c also have such size and shape as permits itself to be inserted into the large-width portion 7e of the inner panel 7 from the front side (car interior side) of the inner panel 7.

And, on the back surface side (car exterior side) of the garnish main body 12, as shown in FIGS. 1, 2, 4 to 6, 8 and 9, there is provided the restricting wall 23 which projects toward the inner panel 7 side of the body 1, in order that the mounting boss portion 13, securing leg portion 17 and sliding/securing portion 19 respectively serving as the connecting/holding portions can be connected together on the side of the main body 42 of the folded air bag 41 that is distant from the opening W, and on the opening W side of the connecting/holding portions 13, 17 and 19. The thickness t (see FIG. 9) of the restricting wall 23 is set in the range of 1–4 mm, in order to be able to prevent any sink from being produced on the front surface side of the molding portion 12a. If the thickness t exceeds 4 mm, then the sink is easy to occur; and, if the thickness t is less than 1 mm, then the molding portion 12a is difficult to mold and, even if the molding portion 12a can be molded, it is difficult to secure a given strength. By the way, in the present embodiment, the thickness t of the restricting wall 23 is set for 2 mm.

Figure 7:
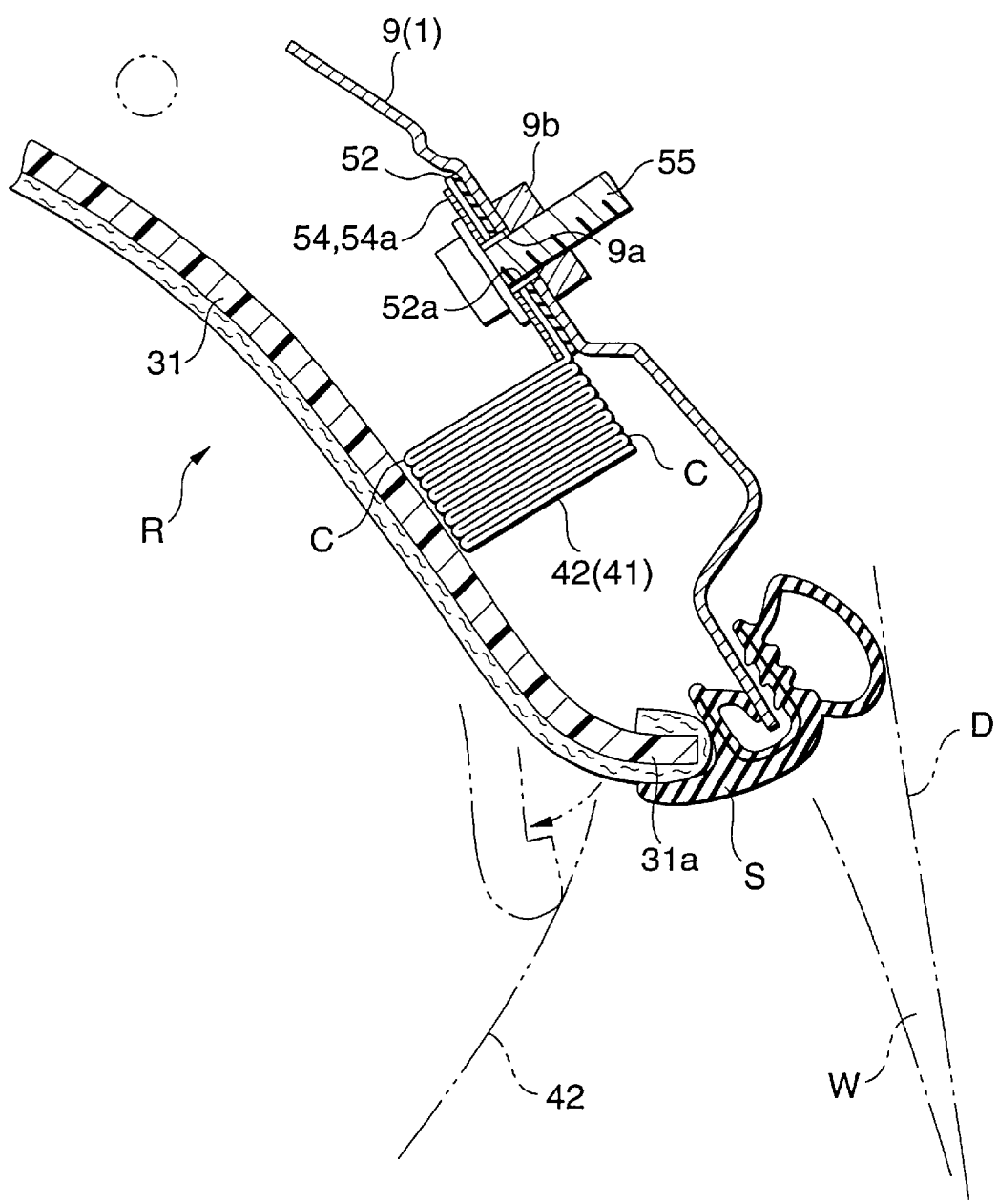
FIG. 7 is an enlarged schematic section view taken along the arrow line VII—VII shown in FIG. 1.

Referring next to the roof side rail R, the roof side rail R, as shown in FIG. 7, includes the folded air bag 41, a roof side rail main body 9 which is formed of a steel plate and situated on the body 1 side, and a roof interior member 31 serving as an air bag cover which can be assembled to the body 1 at a given position (not shown) thereof.

In the roof side rail main body 9, at a given position thereof, there is formed a mounting hole 9a into which the folded air bag 41 can be mounted. The mounting hole 9a is structured such that a nut 9b is fixed to the peripheral edge of the roof side rail main body 9 on the back surface (car exterior side) thereof. Also, a weather strip S is mounted on the end portion of the roof side rail main body 9.

The roof interior member 31 is formed of synthetic resin having such flexibility that, when expanding the air bag 41, the edge 31a thereof on the opening W side can be pressed by the air bag 41 and separated easily from the roof side rail main body 9.

And, the air bag assembly A employed in the side air bag device M according to the present embodiment, as shown in FIG. 10, comprises an air bag 41, an inflator 39, a mounting bracket 36 for connecting the air bag 41 and inflator 39 to each other, a plurality of mounting brackets 54 which can be assembled to the air bag 41 and can be used to mount the air bag 41 onto the body 1, and a tape member 57 for wrapping the folded air bag main body 42.

Figure 11:
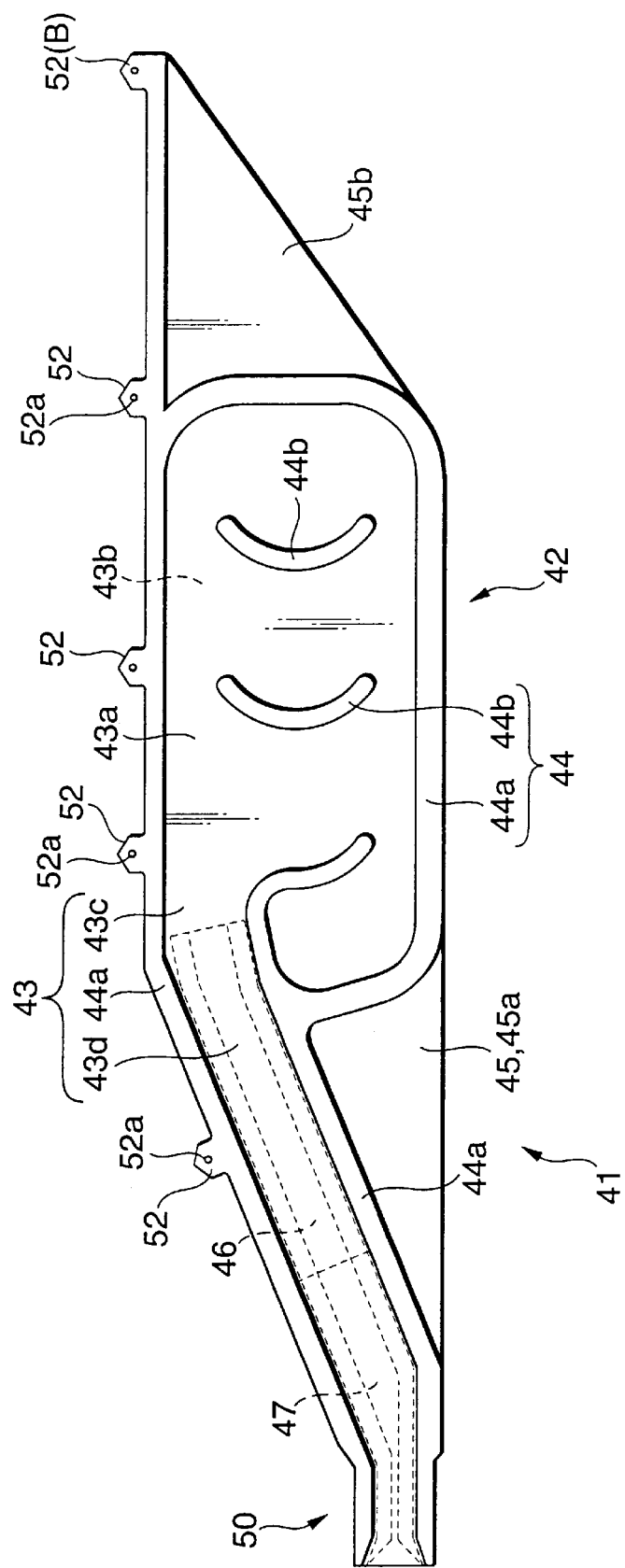
FIG. 11 is a front view of an air bag used in the present embodiment, showing a state of the air bag in which it is developed.

The air bag 41, as shown in FIG. 11, includes an air bag main body 42 which allows the gas for expansion from the inflator 39 to flow therein, and, when the gas for expansion flows therein, can develop from its folded state and expand in such a manner that it increases in thickness; a connecting cylindrical portion 50 to be connected to the inflator 39; and, a plurality of mounting piece portions 52 to be disposed on the upper edge side of the air bag main body 42.

The air bag main body 42, which is formed of polyamide yarn or the like by double weaving the same, comprises a bag portion 43 including a car interior wall portion 43a and a car exterior wall portion 43b, a connecting portion 44 which is densely woven in the peripheral portion and central portion of the bag portion 43 in such a manner that it can seal the bag portion 43, and a plate-shaped portion 45 which is woven in a thin plate shape in the periphery of the connecting portion 44. By the way, after the air bag main body 42 is woven in a bag, on the air bag main body 42, there is formed a coating layer by applying silicone or the like onto the surface of the air bag main body 42, in order to be able not only to enhance the heat resistance of the air bag main body 42 but also to prevent the leakage of the gas for expansion therefrom.

The bag portion 43 includes: an expansion portion 43c which allows the gas for expansion to flow therein and, when the gas for expansion flows therein, can expand in such a manner that it increases in thickness; and, a gas flow-in portion 43d which allows the gas for expansion to flow into the expansion portion 43c.

The connecting portion 44 comprises: a peripheral connecting portion 44a which is densely woven in such a manner that it can seal the bag portion 43 in the periphery of the bag portion 43; and, two central connecting portions 44b which are respectively woven densely in such a manner as to be able to connect the car interior wall portion 43a and the car exterior wall portion 43b to each other in the neighborhood of the central portion of the expansion portion 43c of the bag portion 43. And, the central connecting portions 44b and 44b, when the bag portion 43 is expanded, respectively apply tensile forces onto an area ranging from the connecting cylindrical portion 50 to the upper rear portion of the air bag main body 42 to thereby prevent the expansion portion 43c from moving toward the car exterior side even if such pressure as to move the expansion portion 43c toward the car exterior side is applied to the expansion portion 43c.

The plate-shaped portion 45 is used not only to secure the whole shape of the air bag 41 ranging from the connecting cylindrical portion 50 to the upper rear portion of the air bag main body 42, but also to reduce the volume of the bag portion 43 to thereby shorten the time necessary up to the completion of the expansion of the expansion portion 43c. And, the plate-shaped portion 45 includes a front plate-shaped portion 45a for connecting the gas flow-in portion 43d and expansion portion 43c to each other, and a rear plate-shaped portion 45b for connecting the expansion portion 43c and rear-portion-side mounting piece portion 52B to each other.

The connecting cylindrical portion 50 is mounted on the outside of the inflator 39 and, in more particular, it is disposed on the leading end portion of the gas flow-in portion 43d, that is, the portion of the inflator 39 where the connecting cylindrical portion 50 can be connected to the inflator 39 when it is tightened by the mounting bracket 36.

And, the connecting cylindrical portion 50 includes, on the inner periphery side of the gas flow-in portion 43d, two cylindrical-shaped long and short inner tubes 46 and 47 in order to be able to secure its heat resistance against high-temperature gas for expansion from the inflator 39.

Figure 5:
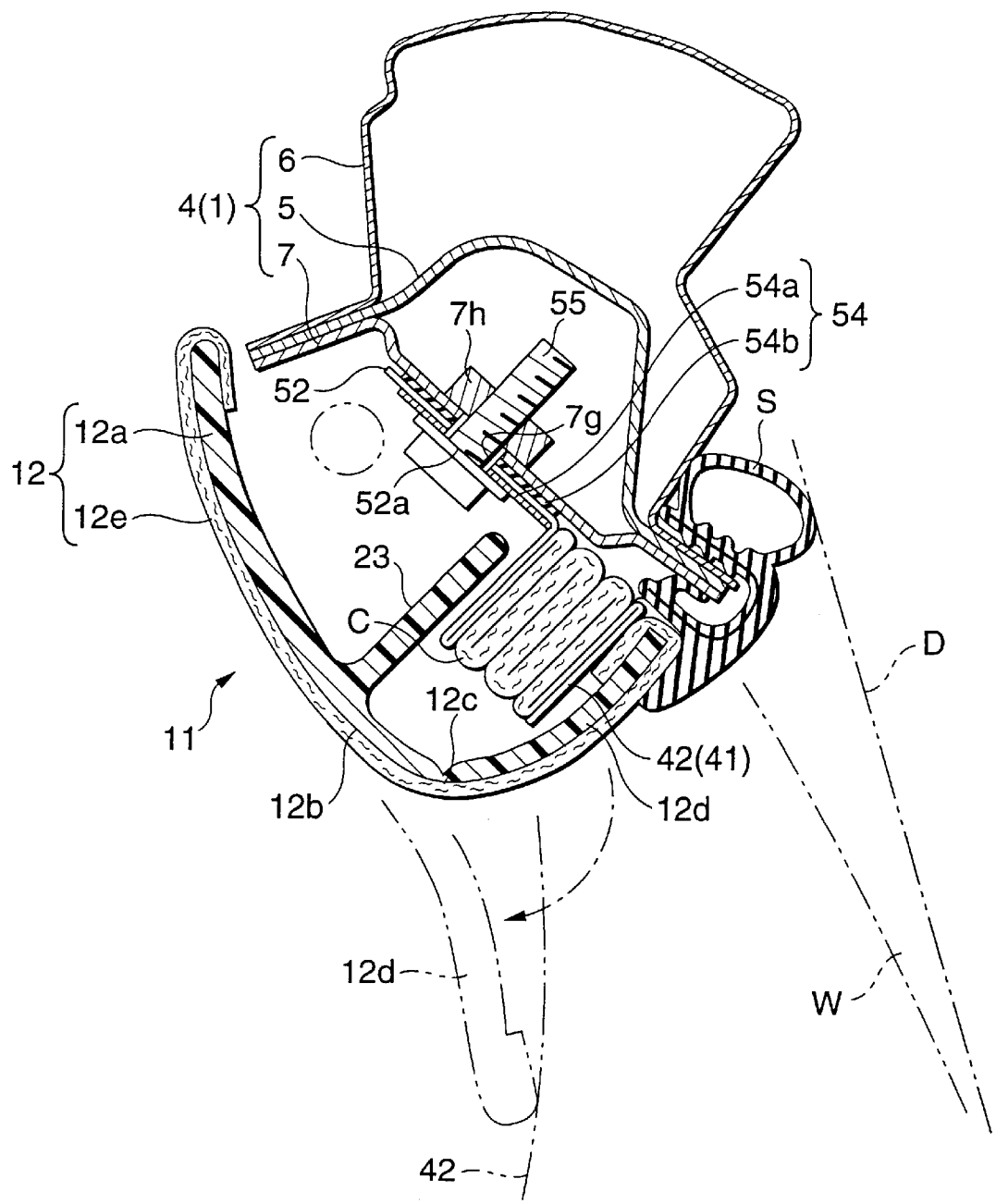
FIG. 5 is an enlarged schematic section view taken along the arrow line V—V shown in FIG. 1.

Referring now to the mounting piece portions 52, as shown in FIGS. 5, 7 and 11, there are formed mounting holes 52a in the mounting piece portions 52 in such a manner that they extend through their respective mounting piece portions 52, and mounting brackets 54 are fixedly secured to their respective mounting piece portions 52, in order that the mounting piece portions 52 can be mounted to the pillar main body 4 and roof side rail main body 9 of the body 1 using their respective mounting bolts 55. Each mounting bracket 54 is composed of metal-plate-made inner and outer plates 54a and 54b which are respectively disposed in the car interior and exterior portions of its associated mounting piece portion 52, while inner and outer plates 54a and 54b include mounting holes 54c respectively in communication with the mounting hole 52a of their associated mounting piece portion 52. In mounting the inner and outer plates 54a and 54b, after their associated mounting piece portion 52 are respectively interposed between their associated inner and outer plates 54a and 54b, if the inner and outer plates 54a and 54b are staked in part, then they can be mounted to their associated mounting piece portion 52.

The inflator 39, which is formed as an inflator of a cylinder type, includes: an inflator main body which is capable of discharging the gas for expansion from a given gas discharge port; and, a diffuser which is fixed to the inflator main body and is used to guide the gas for expansion in the axial direction of the inflator. And, to the end portion of the inflator 39, there is connected a lead wire 39a which is used to input a signal for discharging of the gas for expansion.

The mounting bracket 36, which is formed of a metal plate, is structured such that it can connect the connecting cylindrical portion 50 of the air bag 41 mounted on the outside of the inflator 39 to the inflator 39, and also can mount the inflator 39, with the cylindrical portion 50 connected thereto, onto the side panel 2 of the body 1 using a bolt 37.

The tape member 57 is formed of adhesive tape which is produced by applying adhesives onto cloth, paper or the like.

Next, description will be given below of an operation to mount the side air bag device M onto a car. At first, there is prepared the air bag assembly A previously. The air bag assembly A can be prepared in the following manner.

Figure 12:
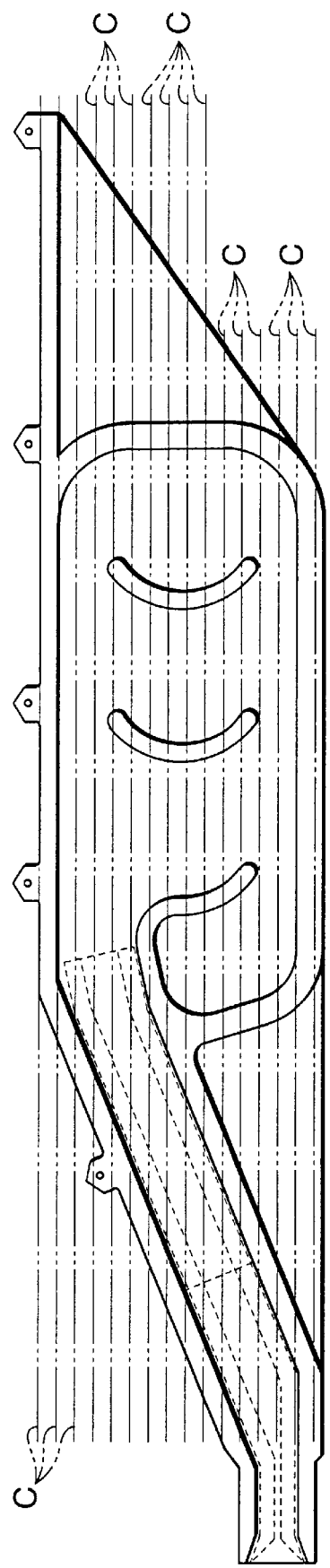
FIG. 12 is a view of folds set in an air bag main body according to the present embodiment, along which the air bag main body is folded.

That is, firstly, the air bag 41 is folded by a given folding machine and is properly wrapped by the tape member 57. As a method for folding the air bag 41, according to the present embodiment, there is employed a twisted folding method in which folds C composed of ridge-shaped folds and recess-shaped folds are sequentially formed in the portions of the air bag 41 that are respectively shown by two-dot chained lines in FIG. 12 and, after then, the air bag 41 is folded along the folds C.

After then, while matching the mounting holes 52a and 54c to each other, the inner and outer plates 54a and 54b are arranged on the two sides of the respective mounting piece portions 52 and are then staked, and the mounting brackets 54 are respectively mounted onto their associated mounting piece portions 52. By the way, the mounting piece portions 52, which have been folded into the air bag 41, are pulled out from their folded positions and, after then, their associated mounting brackets 54 are mounted onto the thus pulled-out mounting piece portions 52.

Also, the folded condition of the connecting cylindrical portion 50 folded into the air bag 41 is also removed and, after then, the inflator 39 is inserted into the inner tube 47 of the thus unfolded connecting cylindrical portion 50, and further the mounting bracket 36 is mounted on the inflator 39.

And, if the mounting bolts 55 are provisionally assembled to their respective mounting brackets 54 at a proper time, then the air bag assembly A can be assembled or prepared.

After then, to mount the air bag assembly A onto the body 1 of the car, as shown in FIGS. 1, 4 and 7, the mounting bracket 36 is mounted on and fixed to the side panel 2 using the mounting bolt 37, and the mounting brackets 54 are respectively arranged in the inner panel 7 of the pillar main body 4 and in the roof side rail main body 9 in such a manner that the mounting holes 54c, 52a, 7g, 9a are matched to each other; and, after then, the respective mounting bolts 55 are threadedly engaged with their associated nuts 7h and 9b through the mounting holes 52a and 54c, so that the air bag assembly A can be mounted onto the body 1.

And, after the air bag assembly A is mounted onto the body 1, the lead wire 39a is connected to a given air bag operation circuit. At the same time, as shown in FIGS. 1 to 7, in the pillar portion PF, the garnish main body 12 is mounted on and fixed to the inner panel 7 and, in the roof side rail portion R, the roof interior member 31 is assembled to a given portion of the body 1, thereby covering the air bag assembly A.

To mount and fix the garnish main body 12 to the inner panel 7, after the securing flange portion 21c of the securing pin 21 is inserted (in particular, it is inserted to a position shown by a two-dot chained line 2lcP in FIG. 3) from the large-width portion 7e of the securing hole 7d, the securing flange portion 21c is moved toward the small-width portion 7f (in particular, it is moved to a position shown by a solid line in FIG. 3) and, at the same time, the securing leg portion 17 is inserted into and secured to the securing hole 7c. Further, the mounting bolt 29 is threadedly engaged with the nut 7b of the mounting hole 7a through the mounting hole 13a of the mounting boss portion 13 and, next, simultaneously when the cap 25, which has been previously connected to the garnish main body 12, is fitted into the storing recessed portion 14, the securing pawl 25b is secured to the securing groove 29b of the bolt 29, thereby being able to complete the operation to mount and fix the garnish main body 12 to the inner panel 7 of the body 1; that is, the mounting of the side air bag device M into the car can be completed.

And, after the side air bag device M is mounted into the car, if the inflator 39 is operated, then the gas for expansion is allowed to flow into the bag portion 43 of the air bag main body 42 of the air bag 41, so that the gas flow-in portion 43d and expansion portion 43c of the bag portion 43 are caused to expand to thereby break the tape members 57. Also, the garnish main body 12 of the garnish 11 in the pillar portion PF is pressed by the air bag main body 42, so that, as shown by two-dot chained lines in FIGS. 2, 4 to 6, the securing leg portion 17 is removed from the securing hole 7c and also the securing flange portion 21c of the securing pin 21 slidingly moves the small width portion 7e of the securing hole 7d to a position of 2lcB shown by a two-dot chained line in FIG. 3. Accordingly, the garnish main body 12 moves its lower portion obliquely upwardly along the pillar portion PF and moves its substantially-vertical-direction middle portion toward the car interior side in such a manner as to part from the inner panel 7, thereby opening the door portion 12d. Further, the roof interior member 31 of the roof side rail portion R is pressed by the air bag main body 42 to thereby, as shown by a two-dot chained line in FIG. 7, open the edge 31a of the roof interior member 31. As a result, as shown by a two-dot chained line in FIG. 1, the air bag main body 42 is developed and expanded greatly in such a manner as to cover the opening W.

Now, as described before, on the back surface side of the garnish main body 12 serving as an air bag cover according to the present embodiment, there is provided the restricting wall 23 which projects toward the inner panel 7 side of the body 1, in order that, when the air bag main body is developed and expanded, the connecting/holding portions 13, 17 and 19 can be connected together due to the restricting wall 23, on the side of the folded air bag main body 42 that is distant from the opening W, and, in more particular, on the opening W side of the connection hold portions 13, 17 and 19. Therefore, until the air bag main body 42 projects toward the opening W side in the developing and expanding operation of the air bag main body 42, even if the pressure F of the air bag main body 42 (see FIG. 8) is going to act on the securing boss portion 13, securing leg portion 17 and sliding/securing portion 19 respectively serving as the connecting/holding portions, the pressure F is allowed to act on only a small area due to the restricting wall 23 disposed on the opening W side of the connecting/holding portions 13, 17 and 19, thereby preventing the pressure F from being applied concentratedly onto the connecting/holding portions 13, 17 and 19 which respectively project on the back surface side of the garnish main body 12, which in turn can reduce pressure loads acting on the respective connecting/holding portions 13, 17 and 19.

Thanks to this, the respective connecting/holding portions 13, 17 and 19 can be formed small in thickness and, in. particular, in the present embodiment, the dimension X of the mounting boss portion 13 and sliding/securing portion 19 in the radial direction thereof as well as the thickness dimension Y of the securing leg portion 17 can be reduced, thereby being able to prevent the occurrence of the sink that could be otherwise produced in molding. By the way, in the present embodiment, the surface layer 12e is bonded to the surface side of the molding portion 12a of the garnish main body 12. However, unless the dimensions X and Y are rather small, in spite of the bonded surface layer 12e, there is a fear that depressions are caused to occur on the front surface side of the garnish main body 12 due to the sink.

Therefore, in the garnish 11 serving as an air bag cover according to the present embodiment, the occurrence of the sink can be prevented to thereby be able to secure a sufficient strength when the air bag 41 is expanded.

By the way, because the thickness t of the restricting wall 23 is set in the range of 1–4 mm, the occurrence of the sink can be prevented on the front surface side of the molding portion 12a.

Also, in the present embodiment, since the expansion of the air bag main body 42 to be moved apart from the opening W is restricted by the restricting wall 23 when the air bag main body 42 is developed and expanded, the projecting direction of the air bag main body 42 is directed in a given direction, thereby being able to increase the fly-out speed of the air bag main body 42 toward the opening W side.

Figure 13:
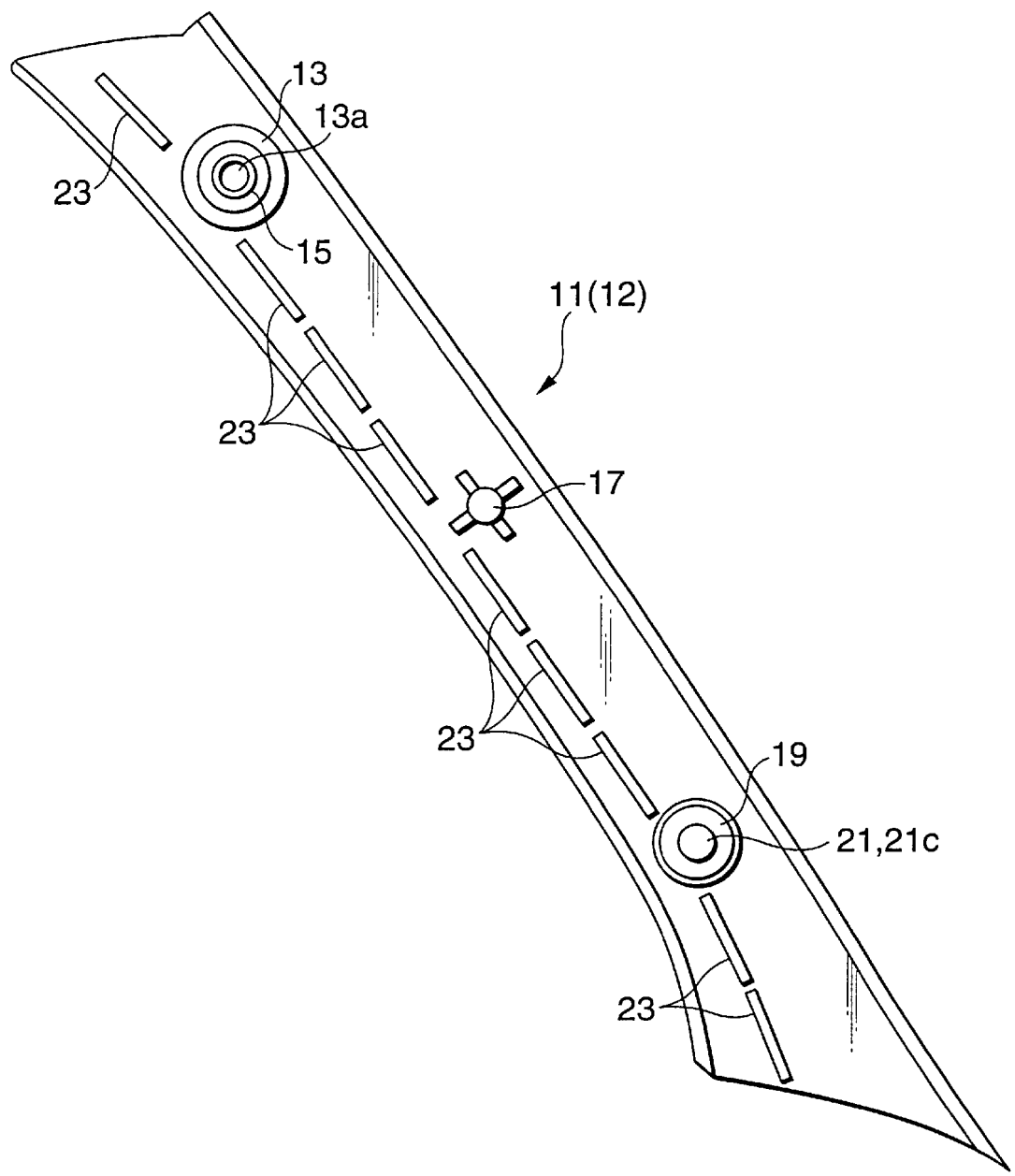
FIG. 13 is a view of a garnish serving as an air bag cover according to another embodiment of the invention, when the garnish is viewed from the back surface thereof.
Figure 14:
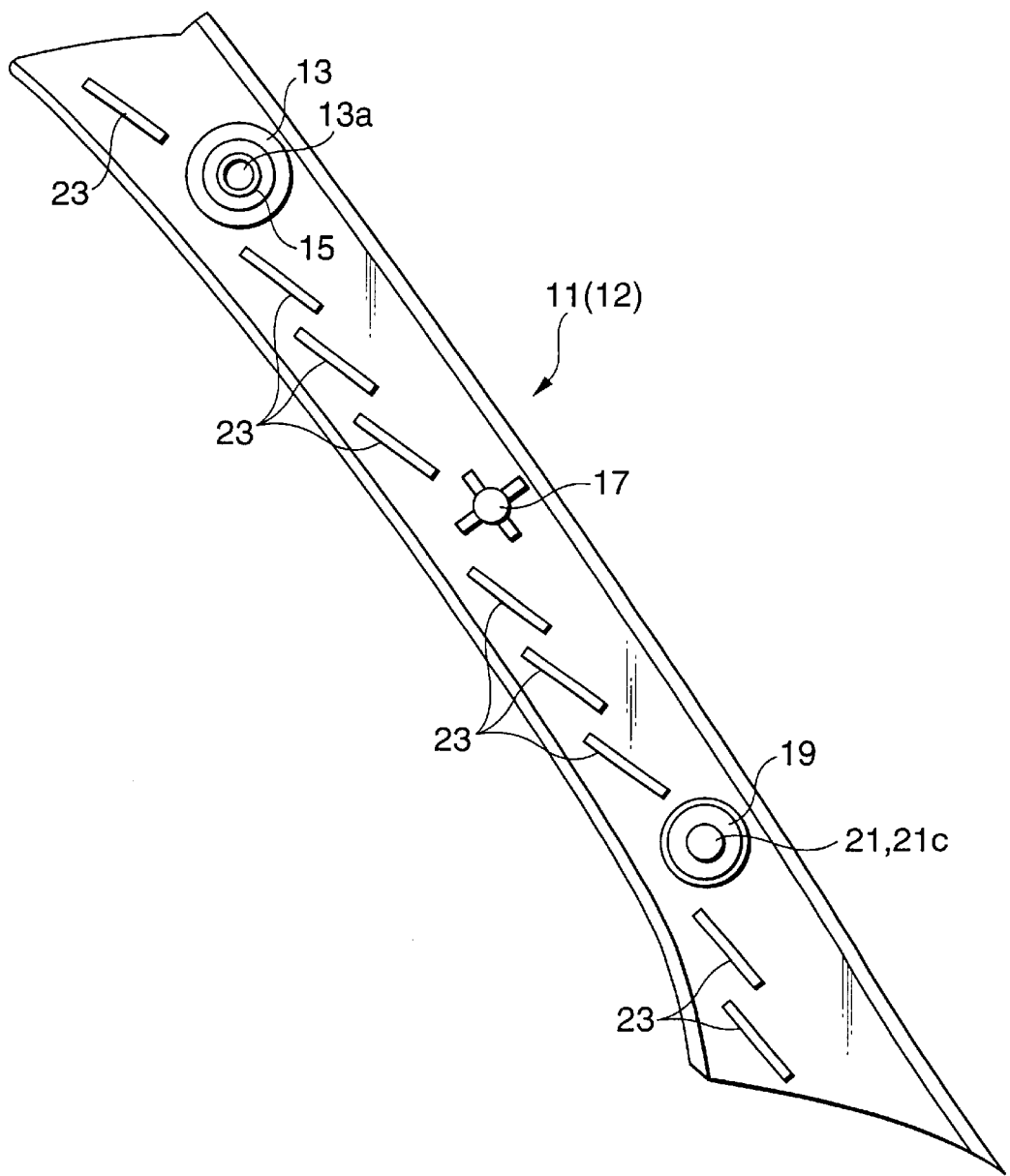
FIG. 14 is a view of a garnish serving as an air bag cover according to still another embodiment of the invention, when the garnish is viewed from the back surface thereof.

Further, in the present embodiment, there is illustrated a case in which the restricting wall 23 is structured in a continuous wall. However, this is not limitative but, for example, as shown in FIG. 13, there can also be employed a structure in which the restricting wall 23 is composed of discontinuous walls 23. Or, as shown in FIG. 14, in consideration of an operation to remove the garnish main body 11 from the mold after it is molded, the individual restricting walls 23 can be arranged in a stepwise manner.

Still further, in the present embodiment, as the connecting/holding portions, there are illustrated the following three portions: that is, the mounting boss portion 13 which is disposed in one end portion of the air bag cover 11 and is to be completely mounted on and fixed to the body 1; the sliding/securing portion 19 which is disposed in the other end portion of the air bag cover 11 and, when the air bag main body 42 is developed and expanded, can be connected to the body 1 in such a manner that it can be slided toward the central portion of the air bag cover ll; and, the securing leg portion 17 which is disposed in the neighborhood of the central portion of the air bag cover 11 and, when the air bag main body 42 is developed and expanded, can be connected to the body 1 in such a manner that it can be removed toward the car interior side. However, this is not limitative but, for example, if the air bag cover is mounted on the body at a plurality of discontinuous positions thereof, then the connecting/holding portions can be all composed of connecting/holding portions that are mounted on and fixed to the body completely, or the connecting/holding portions can be used in combination with other kinds of connect/hold means.

Moreover, in the present embodiment, as the air bag cover, there is illustrated the garnish 11 which is disposed in the front pillar portion PF. Of course, the invention is not limited to this. That is, the invention can also apply to an air bag cover which is disposed in the periphery of the opening formed on the car interior side such the center pillar portion PC, a rear pillar portion and the like, and is connected to and held by the body at a plurality of discontinuous positions thereof.

What is claimed is:

1. An air bag cover being formed of synthetic resin and connected to and held by a car body, said air bag cover being disposed along a peripheral edge of an opening formed on an interior side of the car body for covering an air bag folded in the peripheral edge of the opening, wherein, when the folded air bag is developed and expanded, the air bag cover can be so opened and moved as to allow the air bag to project toward said opening side, said air bag cover comprising:

a cover main body being disposed along the peripheral edge of the opening;

a plurality of connecting/holding portions being discontinuously disposed on said cover main body; and a restricting wall projecting from said cover main body toward the car body side to connect together said plurality of connecting/holding portions, said restricting wall being formed on a side of the air bag that is distant from the opening as well as on the opening side of said connecting/holding portions.

2. An air bag cover according to claim 1, wherein a thickness of said restricting wall is set in a range of 1 mm to 4 mm.

3. An air bag cover according to claim 1, wherein said restricting wall is formed by one integral wall.

4. An air bag cover according to claim 1, wherein said restricting wall is formed by a plurality of walls.

5. An air bag cover according to claim 1, wherein the restricting wall is arranged to extend in substantially a longitudinal direction of the cover main body.

6. An air bag cover according to claim 5, wherein the restricting is integrally formed with the cover main body.

* * * * *